COLLISION DETECTOR
Filed March 3, 1960
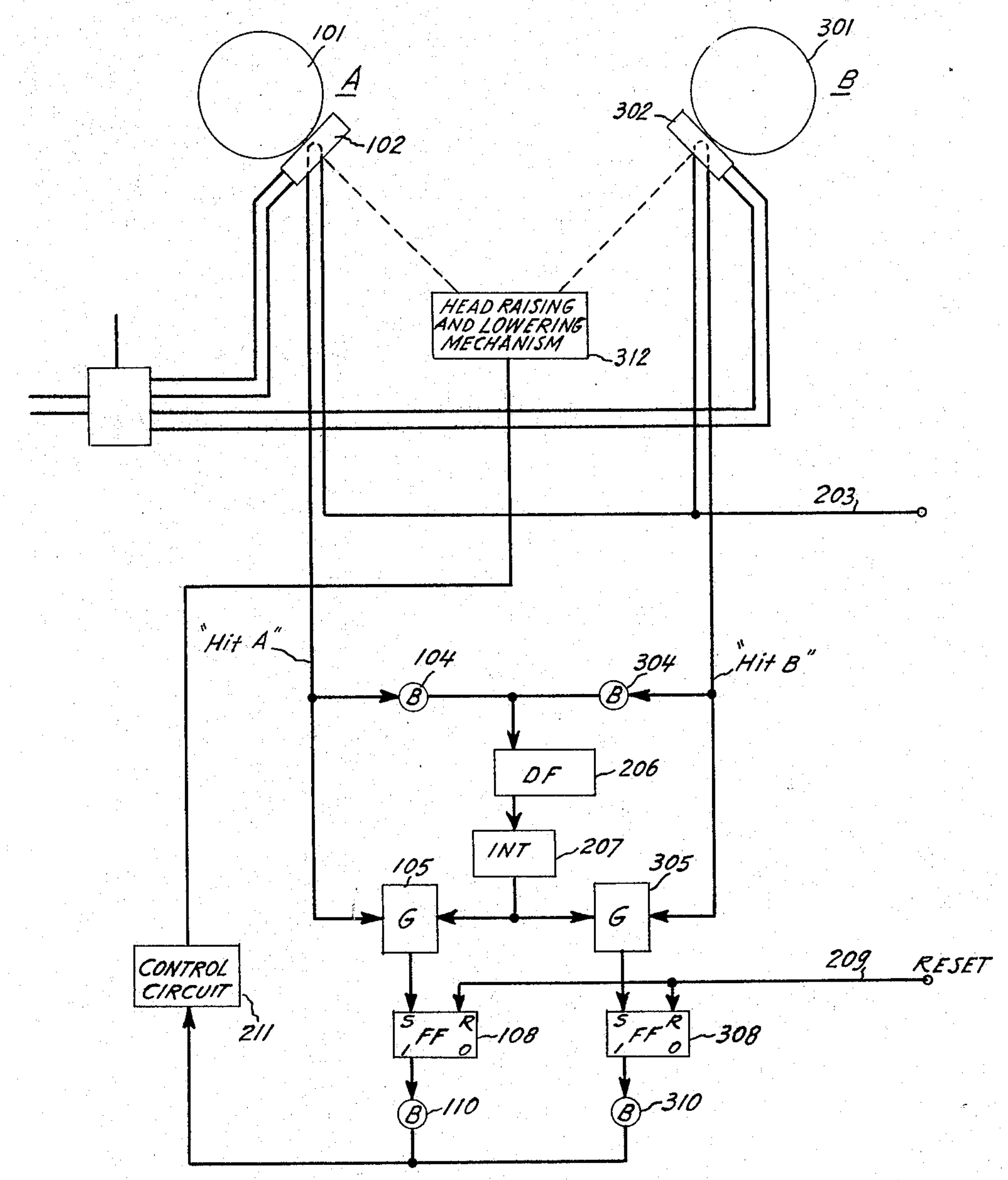
INVENTOR.
BEVERLY L. CREW
BY Fred Fisher
ATTORNEY United States Patent Office 3,290,666
Patented Dec. 6, 1966

3,290,666
COLLISION DETECTOR

Beverly L. Crew, Phoenix, Ariz., assignor to Sperry Rand Corporation, New York, N.Y., a corporation of Delaware Filed Mar. 3, 1960, Ser. No. 12,585
7 Claims. (Cl. 340—174.1)

This invention relates to means for detecting undesired collisions by a magnetic head with a magnetic drum and, in particular, relates to means for detecting certain types of contacts of a flying head with its magnetic drum with provision to send an alarm in such event.

In modern data handling systems, large quantities of data are stored on magnetic drums to handle the flow of data necessary for various business and scientific applications. The magnetic drums store these large quantities of data in the form of a plurality of magnetized areas. A magnetic drum stores data, in the usual fashion, by the use of a plurality of tracks about its periphery. Each circumferential track contains binary coded information in that an element of the track can be magnetized in either one of two directions. For purposes of accuracy, it is desired that the track element reliably indicate its particular magnetizable state.

The information on a magnetic drum can be written on or read from the drum by a flying head at high speeds. The flying head normally does not come in contact with the magnetic drum but is floated above the surface of the drum by a thin film of air. Slight irregularities of the surface of the drum are compensated by the film of air which keeps the head away from the drum by a reasonably constant distance.

Various factors, such as dust, dirt, and other impurities between the surface of the drum and the head, excessive vibration and other causes may cause the flying head to hit the surface of the drum to tend to damage the information stored in the element of the drum. A hit, also, may tend to damage the head. Both a damaged head and damaged information are undesirable.

It is a purpose of this invention to describe a novel means for detecting undesired "hits" (collision of a drum with a head), to raise the head in the event of such detection, and to otherwise indicate that an undesirable hit took place.

It is an object of this invention to provide a novel collision detector.

It is another object of this invention to provide a novel magnetic head and drum collision detector.

A further object of this invention is to provide a novel means for detecting undesirable collisions of a flying magnetic head with a magnetic drum and to raise the head in the event of an undesirable collision.

In accordance with this invention, there is provided a magnetic drum and a flying magnetic head of known design. A head lowering and raising mechanism also of known design which is controlled by a control network lowers the head into engagement with the magnetic drum (separated by a thin film of air) and raises the head away from engagement with the drum. A hit detector network detects undesired hits and signals the control network to raise the heads. The hit detector includes a voltage source which is applied to a high resistance lead that is attached to the magnetic head. The output of the lead from the magnetic head normally remains at a fixed potential level; however, when the magnetic head collides with the magnetic drum, the lead is grounded, thereby providing no output voltage on the lead.

The lead from the magnetic head is coupled to one input of a two-input "and" gate and to a delay flop, or one-shot multivibrator. The set output of the delay flop is integrated by an integrator and applied to the second input of the "and" gate. The output of the "and" gate indicates an undesirable hit. This output can be applied to set a flip-flop, the output of the flip-flop being connected to the control network. The flip-flop can be reset by a clear or reset signal.

The novel features of this invention and other objects and advantages thereof, together with its organization and method of operation, will become more apparent from the following description, when read in connection with the accompanying drawing, in which the sole figure is a block diagram of an embodiment of this invention.

Referring to the figure, there is shown a pair of magnetic drums 101 and 301 also labeled A and B. The drums are rotated at a high rate of speed by means not shown. Communicating with each drum is a magnetic head 102, 302. The detection of an undesirable hit raises both the associated heads 102, 302 respectively. The circuitry shown in the figure detects independently and cooperatively undesired hits in either or both drums 101, 301. As shown in the figure, a voltage line 203 from a positive potential source +V has two branches. One branch of the line 203 is coupled to the head 102 and then to a buffer 104 and to one input of a two-input "and" gate 105. Another branch of the line 203 is coupled to the head 302 and then to a buffer 304 and to one input of a second two-input "and" gate 305. The two branches are labeled "Hit A" and "Hit B" respectively. The outputs of buffers 104, 304 are coupled together to the set input of a delay flop or one-shot multivibrator 206. The set output of the delay flop 206 provides an output for a fixed period of time upon being set. The set output of the delay flop 206 is integrated by an integrator 207. The output of the integrator 207 is connected to the second inputs respectively of the gates 105, 305. The output of the gate 105 is connected to the set input of a flip-flop 108. The output of the gate 305 is connected to the set input of a flip-flop 308. A reset or clear signal on the line 209 is connected to the reset inputs of the flip-flops 108, 308. The "1" or set output terminals of the flip-flops 108, 308 are connected through respective buffers 110, 310 to the control network 211. A flip-flop is a bistable multivibrator, or electrical switch, which provides an output enabling signal at its "1" output terminal upon the application of an enabling signal at its set input terminal. The flip-flop continues to provide an output enabling signal at the "1" output terminal until an enabling signal is subsequently applied to the reset terminal of the flip-flop. The control network 211, upon being actuated by the outputs of the flip-flops 108, 308, activates the heads raising and lowering mechanism 212 to raise the heads 102, 302. The heads 102, 302, subsequently, can be transported by means of a carriage, not shown, longitudinally along the axis of the drums to a landing track. The landing track is a track on the drum which contains no information. The heads remain at the landing track, until subsequent instructions are received to move the heads to a new address.

The purpose of the landing track and its function is described and claimed in a copending application assigned to the present assignee and filed by H. F. Welsh, Serial No. 24,950, filed April 27, 1960, now U.S. Pat. No. 3,200,385.

A positioning mechanism for transporting a carriage along the surface of the drums is described in greater detail and claimed in a copending application assigned to the present assignee and filed by Marvin Jacoby, Serial No. 23,529, filed April 20, 1960, now U.S. Pat. No. 3,225,337.

A contact or collision of a head with its drum is termed a hit. Hits can be of three types, (1) very short, non-repeated contacts; (2) very short contacts which, however, are repeated periodically, for example, once every revolution; (3) long contacts, which is defined to be contacts ¾ millisecond or longer in duration.

The first category of hits can be ignored. However, it is desired to raise the heads 102, 302 when either the second or third types of hits occur. As shown in the figure, normally, the positive potential on the line 203 is transmitted via the heads 102, 302 to the hit detector network to provide nonenabling voltage levels to the buffers 104, 304 and the gates 105, 305. When a head 102 or 302 hits a drum, the voltage level on the "Hit A" or "Hit B" line, respectively, is grounded to provide an enabling signal to its respective buffer 104 or 304 and the gate 105 or 305. Thus, hits with either the drum A or drum B, which are detected by the grounding of the associated head are buffed together to set the delay flop 206 for a period of 75 ms. The 75 ms. period is just slightly longer than a period of one drum revolution. The set output of the delay flop 206 is coupled through the integrator 207, which takes ¾ ms. to build up a voltage sufficient to open up the gates 105, 305. The "Hit A" line is connected to the buffer 104 and the gate 105. The "Hit B" line is connected to the buffer 304 and the gate 305. Thus, when the duration of the contact is less than ¾ ms., the signal does not get through the gate 105, 305. When, however, the hit exceeds ¾ ms. in duration, the latter portion of the hit passes through the gate 105, 305 to set its respective flip-flop 108, 308. Likewise, when a hit, though of short duration, is repeated during the 75 ms. period of the delay flop 206, it also passes through the gates 105, 305 to set its respective flip-flops 108, 308. The outputs of the flip-flops 108, 308 are buffed together through buffers 110, and 310 and connected to the control network 211. The presence of a hit signal to the control network 211 actuates the head raising and lowering mechanism 212 thereby raising the heads 102, 302. Should a significant hit occur while the carriage is at rest, the heads raise, but the carriage does not move, thus providing the opportunity to fully inspect the area where the carriage is presently located. Should the hit occur while the carriage is in motion, the heads 102, 302 raise and the carriage travels to the landing strip. In any event, in order to lower the heads 102, 302, a reset or clear signal is generated on the line 209, by the operation of a switch, not shown. The carriage travels to the landing strip, if not already there, to place the heads in a flying position. The system is now in condition for the detection of subsequent hits.

Typical characteristics of one embodiment of this invention are given below; other characteristics may be used without digressing from the scope of this invention. The storage on one track is 3000 characters, or 21,000 bits. The diameter of the drum is 24 inches. The drum rotates at a speed of 870 revolutions per minute. The bit density per track is 325 p.p.i. A hit is detected when the resistance between head and drum drops below 800 ohms. Various modifications can be made to the circuits which are within the scope of this invention. For example, counting circuits can be added to count the number of hits and to halt the operation of the system by the accumulation of a predetermined number of hits.

What is claimed is:

1. In combination, a magnetic drum adapted to be rotated, a magnetic head adapted to fly over the surface of said drum and adapted to be retracted away from said surface, a control circuit adapted to raise said head when said circuit is actuated, and means for detecting a collision of said head with said drum and for actuating said control circuit in the event of said collision.

2. In combination, a pair of magnetic drums, a pair of magnetic heads adapted to fly over the surface of said drums respectively and adapted to be retracted away from the surface of said drums, a head raising and lowering mechanism common to both of said heads, a control circuit, said control circuit when actuated adapted to control said mechanism to raise both of said heads, and means for detecting a collision by either one of said heads with its respective drum and for actuating said control circuit in the event of said collision.

3. In combination, a magnetic drum adapted to be rotated, a magnetic head adapted to fly over the surface of said drum, means for receiving a potential source, means coupling said receiving means to said head so that said head is normally maintained at said potential source, a delay flop, means coupling said head to the input of said delay flop, an integrator having its input coupled to the output of said delay flop, a two-input "and" gate, means coupling said head to one input of said "and" gate, means coupling the output of said integrator to the second input of said "and" gate, and a flip-flop having its set input terminal coupled to the output of said "and" gate.

4. In combination, a detection line, a delay flop having its input coupled to said detection line, an integrator coupled to the output of said delay flop, an "and" gate having one input coupled to said detection line and having a second input coupled to said integrator, and a flip-flop coupled to the output of said "and" gate.

5. A first detection line, a second detection line, a delay flop, a first means coupling said first detection line to the input of said delay flop, a second means coupling said second detection line to the input of said delay flop, an integrator coupled to the output of said delay flop, a first two-input "and" gate having one input coupled to said first detection line, a second two-input "and" gate having one input coupled to said second detection line, said second inputs of both of said "and" gates being coupled to said integrator, a first flip-flop having its set terminal coupled to the output of said first "and" gate, a second flip-flop having its set terminal coupled to the output of said second "and" gate, means for receiving a reset signal coupled to the reset terminals of both of said flip-flops, and means coupling the output terminals of said flip-flops to an output line.

6. A drum having a cylindrical magnetic surface thereon and adapted to be normally rotated about its axis one revolution per interval of time $t2$, a magnetic transducer head adapted to fly over and magnetically cooperate with said surface without normally physically contacting said surface, said head also being adapted to be retracted away from cooperation with said surface, detection means coupled to said head being adapted to provide an electrical indication when said head abnormally contacts said surface, the duration of said electrical indication being substantially equal to the duration of said abnormal contact, timing means being coupled to said detection means for providing a control signal when said electrical indication is present during a time interval $t1$ to $t3$ immediately following the initiation of an electrical indication, and retraction means being adapted to retract said head upon the receipt of said control signal, the time $t1$ being substantially shorter in time than the time $t2$, the time $t3$ being slightly longer in time than the time $t2$, whereby said head is retracted away from said drum whenever said contact exceeds a duration of time $t1$ and whenever a contact occurs during an interval $t1$ to $t3$ after a previous contact occurred.

7. The combination as claimed in claim 6 wherein said timing means comprises an "and" gate, a first electrical means coupling said detection means to one input of said "and" gate, and a second electrical means coupling said detection means to a second input of said "and" gate, said second electrical means comprising a monostable multivibrator having an output time interval of a time $t3$, and an integrator being coupled to the output of said monostable multivibrator and having a time constant equal to an interval of time $t1$.

References Cited by the Examiner

UNITED STATES PATENTS

| | | | |
|---|---|---|---|
| 2,760,063 | 8/1956 | Andrews | 340—174.1 |
| 2,772,135 | 11/1956 | Hollabaugh | 340—174.1 |
| 2,787,750 | 4/1957 | Jones | 340—174.1 |
| 2,862,781 | 12/1958 | Baumeister | 340—174.1 |
| 2,948,884 | 8/1960 | Guerber et al. | 340—174.1 |

FOREIGN PATENTS 804,441 11/1958 Great Britain.

TERRELL W. FEARS, *Acting Primary Examiner.*

IRVING SRAGOW, E. R. REYNOLDS, BERNARD KONICK, *Examiners.*

R. A. CAHILL, A. I. NEUSTADT, R. M. JENNINGS, R. J. McCLOSKEY, *Assistant Examiners.*